United States Patent [19]
Beck et al.

[11] Patent Number: 5,335,983
[45] Date of Patent: Aug. 9, 1994

[54] HYDRAULIC REGULATOR FOR A BRAKE PRESSURE CONTROL APPARATUS

[75] Inventors: Erhard Beck, Weilburg; Georg Sonnenschein, Eschborn, both of Fed. Rep. of Germany

[73] Assignee: ITT Corporation, New York, N.Y.

[21] Appl. No.: 946,450

[22] PCT Filed: Feb. 10, 1992

[86] PCT No.: PCT/EP92/00279

§ 371 Date: Nov. 6, 1992

§ 102(e) Date: Nov. 6, 1992

[87] PCT Pub. No.: WO92/16397

PCT Pub. Date: Oct. 1, 1992

[30] Foreign Application Priority Data

Mar. 13, 1991 [DE] Fed. Rep. of Germany ........ 4108028

[51] Int. Cl.⁵ .................. F15B 9/12; F16B 21/08; B60K 28/16; B60T 8/36
[52] U.S. Cl. .................. 303/119.2; 137/596.17; 303/87
[58] Field of Search .................. 303/119.2, 87; 137/596.17

[56] References Cited

U.S. PATENT DOCUMENTS

| | | |
|---|---|---|
| 4,175,794 | 11/1979 | Pauwels .................. 303/119.2 |
| 4,690,465 | 9/1987 | Takeda et al. .................. 303/119.2 |
| 5,005,919 | 4/1991 | Shuey et al. .................. 303/119.2 |
| 5,035,469 | 7/1991 | Geilen et al. .................. 303/119.2 |
| 5,205,621 | 4/1993 | Moinard et al. .................. 303/119.2 |

FOREIGN PATENT DOCUMENTS

| | | |
|---|---|---|
| 0329333 | 8/1989 | European Pat. Off. . |
| 0355055 | 2/1990 | European Pat. Off. . |
| 0397442 | 11/1990 | European Pat. Off. . |
| 0441343 | 8/1991 | European Pat. Off. . |
| 2751254 | 5/1978 | Fed. Rep. of Germany . |
| 3728463 | 3/1989 | Fed. Rep. of Germany . |
| 3813138 | 11/1989 | Fed. Rep. of Germany . |
| 3913352 | 10/1990 | Fed. Rep. of Germany . |
| 3930890 | 3/1991 | Fed. Rep. of Germany . |
| 362184961 | 8/1987 | Japan .................. 303/119.2 |
| 1010378 | 4/1983 | U.S.S.R. . |
| 1146511 | 3/1985 | U.S.S.R. . |

*Primary Examiner*—Matthew C. Graham
*Attorney, Agent, or Firm*—Dykema Gossett

[57] ABSTRACT

The invention is related to a hydraulic unit for hydraulic control and regulation of apparatuses, in particular for brake pressure control apparatuses in anti-lock control systems or for traction slip control systems for automotive vehicles. In order to effectively reduce both the noise level depending on the switching positions of the solenoid valves and its diffusion, the invention is based on the concept that while the outlet solenoid valve is open to limit the volume of pressure agent being taken in from the pressure agent source and flowing to the pressure agent consumer through a slide valve which is integrated into the valve accommodation body, a control edge being active at the slide valve reduces the pressure agent flow due to the lifting stroke motion which is dependent on the pressure differential.

17 Claims, 1 Drawing Sheet

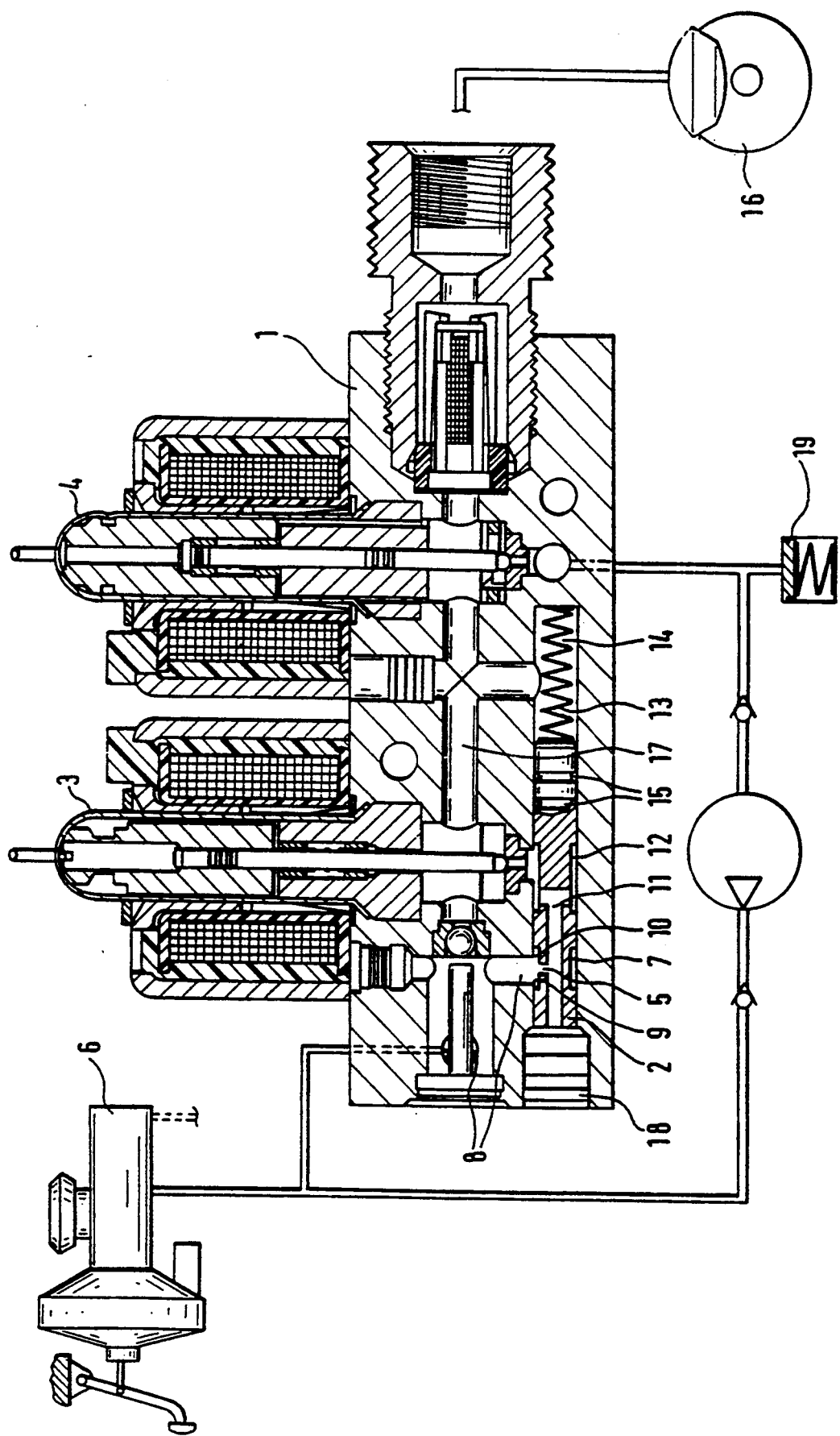

HYDRAULIC REGULATOR FOR A BRAKE PRESSURE CONTROL APPARATUS

BACKGROUND OF THE INVENTION

The invention is related to a hydraulic unit for hydraulic control and regulation of apparatuses and more particularly to hydraulic brake pressure control units in anti-lock control systems or traction slip control systems for automotive vehicles.

Hydraulic units for the control or regulation of pressure agents have a wide range of application in industrial hydraulics. Particular importance has to be attributed to the use of hydraulic units for vehicle equipment, since the pressure agent streams provide high accuracy control even under extraordinary operating conditions.

Especially in regard to the integration of hydraulic units within the vehicle, additional active as well as passive measures have been considered, beyond strictly functional capabilities, which increase satisfaction as far as serviceability and low noise of the system are concerned.

Along these lines, mention has to be made of the arrangement as per the German patent application published without examination, No. 3,913,352 regarding a pressure pulsation damper within a hydraulic unit for brake systems with traction slip control. Depending on their properties of elastic deformation, these pulsation dampers absorb the sound emissions originating from the switching frequencies of the solenoid valves, so that the noise level which is felt to be annoying can be reduced. However, a disadvantage of this method results from the fact that elastic deformation of the pressure pulsation damper also necessarily leads to an undesired increase in the volume of pressure agent being taken in.

SUMMARY OF THE INVENTION

It is, therefore, the object of the invention to preserve the simple set-up of the existing hydraulic unit while devising a method by which the noise level from switching the solenoid valves is effectively reduced without necessitating any additional intake of pressure agent volume during operation.

According to the invention, this object is attained by integrating within the body which accommodates the solenoid valves, a hydraulically actuatable slide valve to control the volume of the pressure agent based on the positions of the solenoid valves.

Thus, the invention is based on the concept that while the outlet solenoid valve is open, the volume of pressure agent being taken in from the pressure agent source and flowing to the pressure agent consumer through a slide valve integrated into the valve accommodation body is limited by insofar as a control edge which operates at the slide valve. The control edge reduces the pressure agent flow due to the lifting stroke motion of the slide valve which is dependent on the pressure differential.

In order to ensure a restricting function, the orifice is integrated directly in the slide valve and, precisely, in the range of an annular groove which links the pressure agent source to the inlet solenoid valve in contrast to the customary arrangement of the orifice within the solenoid valve being switched to free passage in its normal position.

The inventive concept is realized by forming the control edges which limit the volumetric stream by the defining surfaces of the first annular groove and the defining surfaces of a supply duct which is connected to the pressure agent source.

An advantageous pressure agent connection is created between the pressure agent source and the solenoid valve through a pressure agent duct extending substantially in axial direction within the slide valve. A hydraulic connection exists between the first annular groove and another annular groove which extends up to the solenoid valve switched to free passage in its normal position.

The actuation of the slide valve results from controlling the hydraulic pressure acting on it. A compression spring is extended to abut against a front surface of the slide valve within an extended accommodating bore during the normal positioning of the slide valve. Depending on the switching position of the solenoid valve which is closed in its normal position, the front surface of the slide valve facing the compression spring is pressure-relieved as soon as the solenoid valve, acting as an outlet valve, relieves the pressure in the wheel brake.

In the following, further features and advantages of the invention will be explained in more detail making reference to FIG. 1.

BRIEF DESCRIPTION OF THE DRAWINGS

FIG. 1 is a cross section of the hydraulic unit with the components which are required for the actuation of a wheel brake equipped with traction slip control.

DETAILED DESCRIPTION OF THE PREFERRED EMBODIMENT

Referring to FIG. 1, two solenoid valves 3, 4 are incorporated in the valve accommodation body 1. Solenoid valve 3 is disposed on the left in the drawing permitting, in its normal position, a free passage of hydraulic agent between the pressure agent source 6 and the pressure agent consumer 16. Solenoid valve 4, arranged parallel to the solenoid valve 3, is hydraulically closed and prevents the reduction of pressure within the pressure agent consumer 16 in its electromagnetically de-energized, normal position. As a pressure agent consumer 16, a wheel brake coupled to a screwed union for pressure agent transfer is shown in the drawing. In the upstream direction, before solenoid valve 3, which is shown switched to free passage in its normal position, a brake pressure master cylinder assisted by an auxiliary pressure source constitutes the pressure agent source 6 of the brake unit. Through a supply duct 8, connected to pressure agent source 6 within the valve accommodation body 1, pressure agent is conveyed to the first annular groove 7. First annular groove 7 is recessed in the slide valve 2. A hydraulic link is created from first annular groove 7 through the orifice 5, positioned downstream, and the pressure agent duct 11, running substantially in the axial direction, to a second annular groove 12 which interacts with the solenoid valve 3 being switched to free passage in its normal position. The end of valve 2 is furnished with annular grooves 15 to prevent a short circuit flow between pressure agent source 6 and consumer 16. The solenoid valve 3, mentioned above, is furnished with a direct hydraulic connection of the hydraulic duct 17 to the pressure agent consumer 16. Hydraulic duct 17 is directly connected with the accommodating bore 14 enclosing the compression spring 13. This arrangement, depending on the switching position of the solenoid valves 3, 4, brings about the desired hydraulically controlled lifting stroke motion of the slide valve 2 during the pressure modulation. Slide valve 2 is arranged parallel to said hydraulic duct 17 which connects the two solenoid valves 3, 4 to the wheel brake and which is connected through a transverse duct to the extended accommodating bore 14 of the slide valve 2. This arrangement results in the slide valve 2 being basically directed into the depth of the valve block 1. Slide valve 2 is inserted into the accommodating bore 14 together with tile compression spring 13 from the left side of the valve block 1 as viewed in the drawing and is pressure agent-tightly sealed by means of a sealing plug 18.

Method of operation:

In the normal braking mode, free of traction slip, all valves remain in the position shown in the drawing. Under the action of the compression spring 13, the slide valve 2 contacts the sealing plug 18 in such a manner that the first annular groove 7, which is furnished with the orifice 5, is open in the direction of the pressure agent source 6. The left-hand solenoid valve 3 is open when de-energized, whereas the right-hand solenoid valve 4 blocks the reflux to a storage tank 19. As a result, the pressure agent will be conveyed from the power brake unit acting as a pressure agent source 6 to the open first annular groove 7, from there through the orifice 5 and the substantially axially extending pressure agent duct 11 within the slide valve 2 to the open solenoid valve 3 and finally also to the wheel brake-side pressure agent consumer 16. When the sealing plug 18 is designed in the shape of an adjusting screw, exact adjustment of the control edge 9, 10 is provided at the slide valve 2, so that the control of the volumetric stream can be varied independently of spring tolerances.

When, for the purpose of the reduction of the pressure during the wheel slip control phase, the solenoid valve 4 is switched from the de-energized normal position to open the reflux of pressure agent from the storage tank 19, the front surface of the slide valve 2 abutted against the compression spring 13 is pressure-relieved so that the annular groove 7 at the slide valve 2 which is subject to the pressure exerted by the pressure agent source 6 provides a defined lifting stroke motion of the slide valve 2 opposing the action of the spring 13. As a result, the control edge 9, 10 which is active at the first annular groove 7 will shut off the supply duct 8 of the pressure agent source 6 which will necessarily lead to a limitation of the volumetric stream and, thus, also to a reduction of the valve switching noise.

Thanks to the integration of a slide valve 2 within the valve accommodation body 1, a limitation of the volumetric stream can be realized and, as a result, the switching noise of the solenoid valves 3, 4 can be greatly reduced. Moreover, because the slide valve 2 and the valve accommodation body 1 have an adequately narrow-tolerance play, additional sealing elements can be foregone without giving rise to any annular gap leakage which would impair regular functioning. In this way, a cheap stream limiter which is optimized as to mounting space is realized within the valve block 1 without any major constructional modifications to the solenoid valves 3, 4 or to the valve accommodation body 1. The original routing of ducts within the valve accommodation body 1 can be maintained without change and finally, merely an extension of the supply duct 8 is required relative to the hydraulic duct 17 to directly link the solenoid valves 3, 4. The hydraulic link between the accommodating bore 14 and the hydraulic duct 17 leading to the consumer connection, requires but an additional drilling operation in vertical direction with respect to the hydraulic duct 17.

The embodiment related to a valve block for brake units equipped with traction slip control makes clear the basic invention. Application of the invention to other analogous designs and applications can be readily imagined without requiring detailed illustrated. As to its teachings, the present invention can be applied to any hydraulic device controlled electromagnetically which needs to limit the switching noise.

We claim:

1. A hydraulic unit for regulating a volumetric stream of pressure agent flowing through a brake pressure apparatus linking an upstream supply source of said pressure agent to a downstream pressure agent consumer, the pressure control apparatus including a valve accommodation body which accommodates at least one first solenoid valve and at least one second solenoid valve, each said solenoid valves having open and closed switching positions and said solenoid valves cooperation, when said at least one first solenoid valve is open and said at least one second solenoid valve is closed, to provide free passage of said pressure agent from said supply source to said pressure agent consumer, and which accommodates pressure agent ducts, the hydraulic unit comprising:

a hydraulically actuatable slide valve for integration into said valve accommodation body to control the pressure agent volume depending on the switching position of said solenoid valves, said slide valve having an axial duct within said slide valve and an orifice communicating with said axial duct, said orifice for registering with one of said pressure agent ducts to receive pressure agent through said orifice and through said axial duct when said slide valve is in a first position and said at least one first solenoid valve is open and said at least one second solenoid valve is closed; and biasing means for exerting a force upon said slide valve to bias said slide valve into said first position.

2. A hydraulic unit as in claim 1, further comprising:

adjustment means for forcing said slide valve against said biasing means and for shifting said first position to change the position of said orifice with respect to said one of said pressure agent ducts with which said orifice is in registry to control the volumetric stream independently of the force of said biasing means.

3. A hydraulic unit as in claim 1 or in claim 2, wherein said slide valve has a first annular groove and said orifice penetrates in radial direction through said first annular groove.

4. A hydraulic unit as in claim 1, wherein said slide valve has a first annular groove having defining surfaces and edges, the defining surfaces of said first annular groove being disposed between said edges, said edges for cooperating with at least one edge of at least one defining surface of said one of said pressure agent ducts to form control edges within said valve accommodation body, said control surfaces being movable relative to each other.

5. A hydraulic unit as in claim 1, wherein said slide valve has a second annular groove communicating with said at least one first solenoid valve and wherein said axial duct forms a hydraulic connection between said first annular groove and said second annular groove.

6. A hydraulic unit as in claim 5, wherein said orifice and said first and second annular grooves are configured on said slide valve to serially link said pressure agent source to said at least one first solenoid valve, when said slide valve is in said valve accommodating body.

7. A hydraulic unit as in claim 5, wherein said first annular groove has a smaller groove width as compared to said second annular groove in order to control the volumetric stream of said pressure agent.

8. A hydraulic unit as in claim 1, wherein said slide valve has a front surface and wherein said biasing means is a compression spring, said front surface having said compression spring pressing thereupon and said front face being subjected to controlled hydraulic pressure.

9. A hydraulic unit as in claim 8, wherein said compression spring is adapted for positioning within an extended accommodating bore penetrating through said valve accommodation body for guiding said slide valve, said accommodating bore being pressurized depending on the switching position of said at least one second solenoid valve.

10. A hydraulic unit as in claim 8, wherein said slide valve has an end portion including said front surface, said end portion also including a plurality of annular grooves, said end portion preventing a short circuit flow between said pressure agent source and said pressure agent consumer.

11. A hydraulic control unit for controlling a stream of a pressure agent flowing from a pressure agent supply source to a pressure agent consumer, the hydraulic control unit comprising:

a valve accommodation body;

at least one first solenoid valve and at least one second solenoid valve housed in said valve accommodation body, each said solenoid valves having open and closed switching positions and said solenoid valves cooperating, when said at least one first solenoid valve is open and said at least one second solenoid valve is closed, to provide free passage of said pressure agent from said supply source to said pressure agent consumer;

a hydraulically actuatable slide valve housed in said valve accommodation body to control the of said pressure agent depending on the switching position of said solenoid valves, said slide valve having an axial duct within said slide valve and an orifice communicating with said axial duct, said slide valve movable to and from a first position;

at least one first pressure agent duct having upstream and downstream ends, said upstream end for receiving pressure agent from said pressure agent supply source and said downstream end registering with said orifice to supply pressure agent through said orifice and through said axial duct when said slide valve is in said first position and said at least one first solenoid valve is open and said at least one second solenoid valve is closed; and biasing means for biasing said slide valve into said first position.

12. A hydraulic control unit as in claim 11, further comprising:

adjustment means forcing said slide valve against said biasing means for shifting said first position to change the position of said orifice with respect to said downstream end of said at least one first pressure agent duct to change the volumetric flow of said pressure agent through said orifice.

13. A hydraulic control unit as in claim 12, wherein said slide valve has a first annular groove and said orifice penetrates in radial direction through said first annular groove.

14. A hydraulic control unit as in claim 11, wherein said slide valve has a first annular groove having defining surfaces, said defining surfaces of said first annular groove cooperating with defining surfaces of said at least one first pressure agent duct to form control edges within said valve accommodation body, said control surfaces being movable relative to each other by said adjustment means.

15. A hydraulic control unit as in claim 11, wherein said slide valve has a first annular groove communicating with said at least one first solenoid valve when said at least one first solenoid valve is open and wherein said axial duct within said slide valve forms a hydraulic connection between said first annular groove and said second annular groove.

16. A hydraulic control unit as in claim 11, wherein said valve accommodating body has an extended accommodating bore for guiding said slide valve, wherein said biasing means includes a compression spring positioned within said accommodating bore and exerting a force upon said slide valve, and wherein said slide valve has a front surface, said front surface being subjected to the force of said compression spring, said accommodating bore being pressurized depending on the switching position of said at least one first solenoid valve.

17. A hydraulic control unit as in claim 16, wherein said slide valve has a front end portion including said front surface, said front end portion having a plurality of annular grooves to prevent a short circuit flow between said pressure agent source and a pressure agent consumer, said orifice and said first and second annular grooves being configured to connect a series link between said pressure agent supply source and said at least one first solenoid valve, said first annular groove being of a smaller groove width than said second annular groove for controlling the volumetric stream of said pressure agent.

* * * * *

UNITED STATES PATENT AND TRADEMARK OFFICE
CERTIFICATE OF CORRECTION

PATENT NO. : 5,335,983
DATED : August 9, 1994
INVENTOR(S) : Erhard Beck
Georg Sonnenschein It is certified that error appears in the above-indentified patent and that said Letters Patent is hereby corrected as shown below:

On the cover page at item 73, the Assignee "ITT Corporation" should read --Alfred Teves GmbH, Fed. Rep. of Germany--.

Signed and Sealed this

Seventh Day of February, 1995

Attest:

BRUCE LEHMAN

Attesting Officer

Commissioner of Patents and Trademarks